United States Patent [19]

Thomas

[11] Patent Number: 4,819,139
[45] Date of Patent: Apr. 4, 1989

[54] RECHARGEABLE FLASHLIGHT ASSEMBLY FOR AUTOMOTIVE VEHICLES

[76] Inventor: Jack L. Thomas, 632 E. St., Room 301, Chula Vista, Calif. 92010-2119

[21] Appl. No.: 140,585

[22] Filed: Jan. 4, 1988

[51] Int. Cl.⁴ ................................................. F21L 9/00
[52] U.S. Cl. .................................... 362/183; 362/190; 362/191; 362/194; 362/202
[58] Field of Search ............... 362/183, 253, 194, 190, 362/195, 202

[56] References Cited

U.S. PATENT DOCUMENTS

| | | | |
|---|---|---|---|
| 3,277,358 | 9/1963 | Nicholl | 320/59 |
| 3,521,050 | 7/1970 | Shagena, Jr. | 362/183 |
| 3,524,124 | 8/1970 | Perkinson | 323/225 |
| 3,749,905 | 7/1973 | Friedman et al. | 362/183 |
| 3,787,678 | 1/1974 | Rainer | 362/183 |
| 3,835,309 | 9/1974 | Witte et al. | 362/183 |
| 3,885,211 | 5/1975 | Gutai | 362/183 |
| 4,092,580 | 5/1978 | Prinsze | 362/183 |
| 4,327,401 | 4/1982 | Siiberg | 362/183 |
| 4,388,673 | 6/1983 | Maglica | 362/183 |
| 4,571,532 | 2/1986 | Jaster | 320/2 |
| 4,605,993 | 8/1986 | Zelina, Jr. | 362/183 |

FOREIGN PATENT DOCUMENTS 2241744  4/1975  France ............................ 362/183

Primary Examiner—Ira S. Lazarus
Assistant Examiner—Sue Hagarman
Attorney, Agent, or Firm—Keith D. Beecher

[57] ABSTRACT

A rechargeable flashlight assembly intended particularly for use in automobiles, aircraft, boats and other automotive vehicles, which serves to assure that an operable flashlight will be available at all times. The assembly comprises a receptacle adapted to be mounted on the dashboard, or other suitable location in the vehicle, and which houses an electrical charging unit; and a flashlight containing rechargeable batteries which is constructed to be inserted into the receptacle when not in use to establish contact with the charging units so that its batteries will be maintained in a charged state.

3 Claims, 1 Drawing Sheet

RECHARGEABLE FLASHLIGHT ASSEMBLY FOR AUTOMOTIVE VEHICLES

BACKGROUND OF THE INVENTION

Users and operators of automotive vehicles readily appreciate the need to have a flashlight available in the vehicle, especially for emergencies. Such flashlights are usually kept in the glove compartment of the vehicle. However, under usual circumstances the flashlight either is not in the glove compartment when wanted, or if it is in the glove compartment, its batteries are dead.

The principal objective of the present invention is to provide a flashlight-receptacle assembly, by which the flashlight not only may be stored in an automotive vehicle in a convenient and readily accessible position, but also by which the flashlight batteries are always maintained in a fully charged condition.

DETAILED DESCRIPTION OF THE ILLUSTRATED EMBODIMENT

Figure 1:
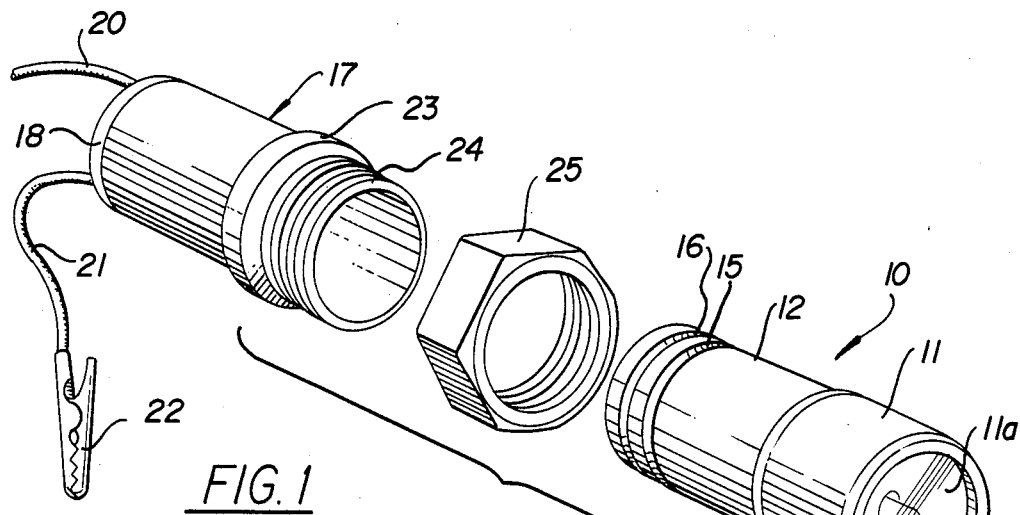
FIG. 1 is an exploded perspective representation of a flashlight and receptacle, representing one embodiment of the invention.

As shown in FIG. 1, the assembly of the present invention comprises a flashlight designated generally as 10, having a rotatable head assembly 11. The head assembly is rotatable with respect to the flashlight body 12 to turn the flashlight on and off, and also to focus the light beam from the flashlight from a flood to spot condition. The flashlight 10 is adapted to plug into a receptacle 17.

Figure 2:
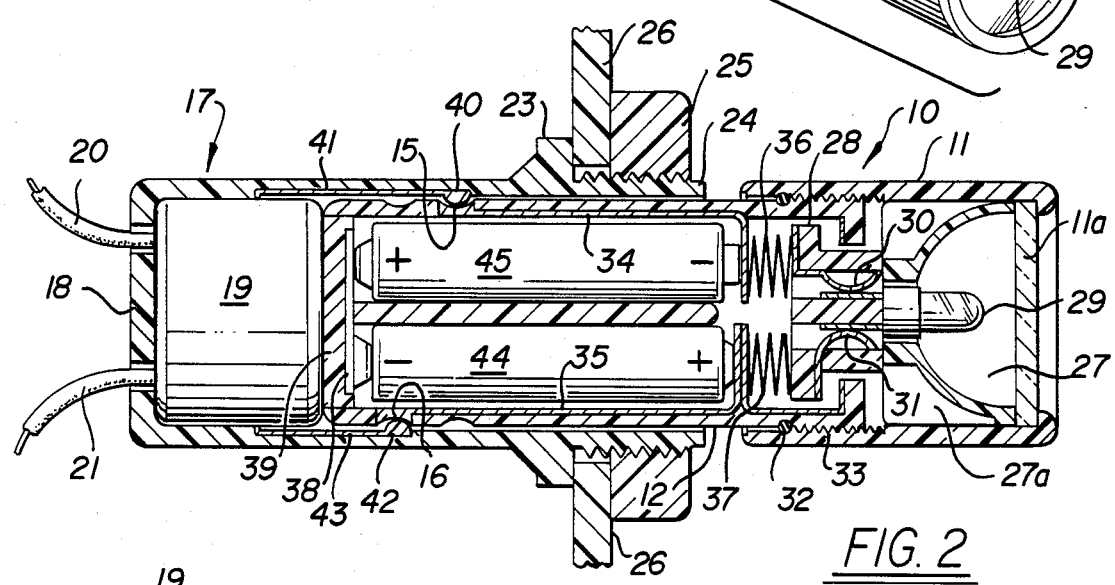
FIG. 2 is a side sectional view of the flashlight and receptacle of FIG. 1 shown mounted on a dashboard.

As shown in FIGS. 1 and 2, the flashlight body 12 serves as a housing for a pair of rechargeable batteries 44, 45. The body 12 is fitted with a positive connector ring 15 and a negative connector ring 16 at its base. These connector rings also function as a quick release locking means for the flashlight body 12, when the flashlight is inserted into the charger receptacle 17. An electric charger unit 19 is mounted in receptacle 17 at the base end of the receptacle, and a positive lead 20 and negative or ground lead 21 from the charger unit extend through the base end 18 of the receptacle. The negative lead 21 is preferably fitted with an alligator clamp 22 (FIG. 1) for connection to existing wiring of the vehicle. Receptacle 17 has a shoulder ring 23 at its forward end, and a threaded portion 24 extending forwardly from the shoulder 23. The receptacle may be mounted on the dashboard 26 of the vehicle by means of a lock nut 25 which is threaded onto threads 24 at the forward end of the receptacle, as shown in FIG. 2.

The flashlight head assembly 11 is threaded to body 12. A parabolic reflector 27 is mounted in the head having ribbing 27a. A window disc 11a is mounted at the forward end of head 11. A lamp socket 28 is mounted within the head, and is fitted with connectors 30 and 31 which function as a switch and holder for bulb 29 which may, for example, be a bi-pin bulb. The flashlight body 12 is fitted with a positive connector wire 34 connected to connector ring 15, and a ground wire 35 connected to connector ring 16. Compression springs 36 and 37 are placed between the connector wires and the bulb socket 28.

The tail cap 39 of the flashlight is fitted with a bridge connector 38 which interconnects the batteries 44 and 45 in series. Receptacle 17 is provided with connector leads 41 and 43 having respective contacts 40 and 42 which engage connector rings 15 and 16 respectively when the flashlight is inserted into the receptacle, as shown in FIG. 2.

Figure 3:
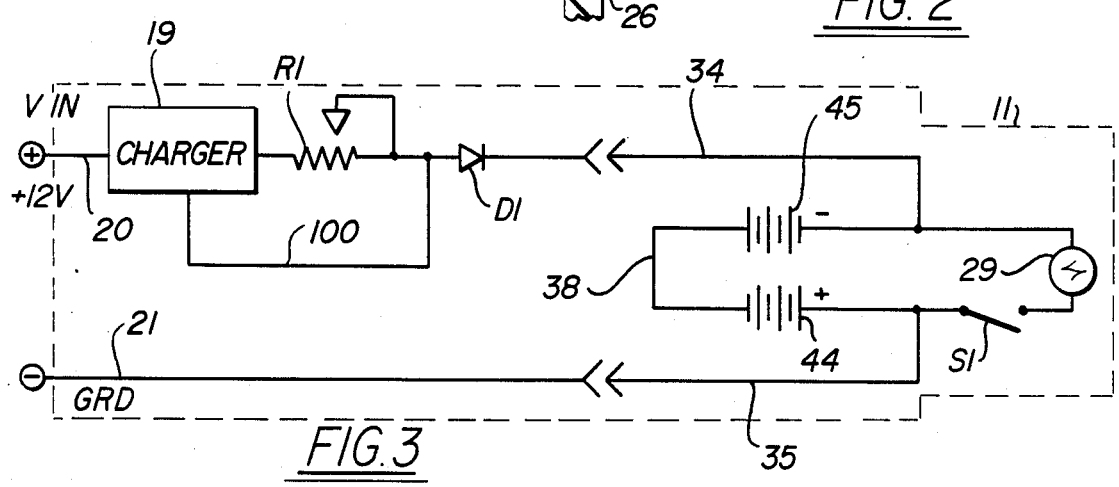
FIG. 3 is a circuit diagram of the internal components of the flashlight of FIGS. 1 and 2.

The circuit diagram of the assembly is shown in FIG. 3.

The charger unit 19 may be any appropriate commercially available type, and may be of the type designated LM317. The voltage output of the charger may be adjusted by adjustment of a potentiometer R1, so as to adjust the charging current flow into the batteries 44 and 45. The charger 19 is a constant current source power unit. When the batteries are fully charged, so that their voltages are equal to the voltage output of charger 19, diode D1 serves to block the back current, and a sense line 100 serves to switch off the charger 19. Charger 19 accordingly remains off until the batteries 44 and 45 discharge and their voltage drops so as to render diode D1 conductive. Diode D1 may be of the type designated IN914. The switching mechanism in the head 10 in FIGS. 1 and 2 is designated as switch 51 in FIG. 3.

The invention provides, therefore, an improved rechargeable flashlight and receptacle combination. The flashlight may be inserted into the receptacle when not in use, and is retained in the receptacle with its batteries in a fully charged condition. The assembly finds particular use, as mentioned above, in conjunction with various types of automotive vehicles.

It will be appreciated that while a particular embodiment of the invention has been shown and described, modifications may be made. It is intended in the claims to cover all modifications which come within the spirit and scope of the invention.

I claim:

1. In combination: A flashlight including a hollow tubular body and at least one rechargeable battery housed in the body; a receptacle having an open end for receiving the body of the flashlight in coaxial relationship when the flashlight is inserted into the receptacle through the open end thereof; a battery charger mounted in the receptacle; and means for establishing electrical contact between the charger and the battery when the flashlight is inserted into the receptacle, said means comprising a pair of axially spaced connector rings mounted on said body in coaxial relationship therewith; and a pair of connector leads mounted in said receptacle and extending axially along the inner surface thereof, said leads having contacts at the respective ends thereof for engagement with said connector rings when the flashlight body is inserted into the open end of the receptacle, said contacts and said connector rings having mating concave/convex surfaces so that said connector leads also serve to retain the flashlight in the receptacle.

2. The combination defined in claim 1, and which includes a motor vehicle having a dashboard, and in which said receptacle is mounted on the dashboard of the motor vehicle.

3. The combination defined in claim 2, in which said receptacle has a threaded forward end adapted to extend through an opening in the dashboard of the motor vehicle, and a lock nut adapted to be threaded to the end of the receptacle to retain the receptacle on the dashboard of the vehicle.

* * * * *